(12) United States Patent
McDonald et al.

(10) Patent No.: US 7,127,054 B1
(45) Date of Patent: Oct. 24, 2006

(54) SYSTEM AND METHOD FOR DETECTING SS7 MESSAGING INEFFICIENCY

(75) Inventors: Randy M. McDonald, Roswell, GA (US); Terry R. Droke, Woodstock, GA (US); Mortimer P. Burnett, Lawrenceville, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 404 days.

(21) Appl. No.: 10/216,807

(22) Filed: Aug. 13, 2002

(51) Int. Cl.
*H04M 7/00* (2006.01)
(52) U.S. Cl. ............... 379/219; 379/32.03; 379/221.08; 379/230
(58) Field of Classification Search ............. 379/32.01, 379/32.02, 32.03, 32.05, 112.01, 112.06, 379/112.08, 133, 134, 137, 138, 219, 221.08, 379/230, 221.01, 229, 14.01, 221.12
See application file for complete search history.

(56) References Cited

U.S. PATENT DOCUMENTS

| | | | | |
|---|---|---|---|---|
| 5,475,732 A | * | 12/1995 | Pester, III | 379/32.01 |
| 5,592,530 A | * | 1/1997 | Brockman et al. | 379/32.03 |
| 5,828,729 A | * | 10/1998 | Clermont et al. | 379/32.01 |
| 6,028,914 A | * | 2/2000 | Lin et al. | 379/14 |

* cited by examiner

*Primary Examiner*—Bing Q. Bui
(74) *Attorney, Agent, or Firm*—Withers & Keys, LLC

(57) ABSTRACT

The present invention uses a software program to analyze all of the SS7 message traffic in a telephone network. By comparing point codes in the message data, the present invention can detect invalid and undesirable network inefficiencies in different types of telephone networks, including for example, wireline, wireless, or hybrid networks.

35 Claims, 2 Drawing Sheets

SYSTEM AND METHOD FOR DETECTING SS7 MESSAGING INEFFICIENCY

BACKGROUND

1. Field of the Invention

The present invention relates generally to the field of telecommunications. More particularly, the present invention relates to systems and methods for detecting errors that cause inefficient telephone network operation.

2. Background of Invention

SS7 is an out-of-band signaling system for the exchange of call-related information between network switching offices, in support of voice and nonvoice services. SS7 messages are exchanged between network elements over bi-directional channels called signaling links. SS7 messaging allows flexibility in providing telephone services. Numerous services such as caller ID, call forwarding, and call conferencing are made possible or greatly enhanced by SS7 messaging. However, SS7 messaging can also give rise to a number of network inefficiencies and trouble conditions. For example, invalid conditions can that consume telephone network resources without providing any benefit to the telephone network. Valid, but undesirable telecommunications events, can waste network resources. Examples of these conditions include call looping, misrouted traffic, unreported mass calling, and excessive redialing.

A call looping condition occurs when a telephone call originated by a calling party to a called party loops between an originating end office and a terminating end office one or more times. Such looping conditions can occur for a number of reasons. One common reason is errors in translations tables that are provisioned in end offices of the telephone network.

A common source of call looping occurs when a first telephone company uses a second telephone company to perform some or all of the first telephone company's call routing. The second telephone company routes its own numbers as well as those numbers sent to it by the first telephone company according to routing tables established in a switch of the second telephone company.

If the first telephone company incorrectly activates an NPA-NXX, a call looping condition can occur. For example, the first telephone company might activate a particular NPA-NXX for testing purposes, but not isolate it from the rest of the system. In that case, if a subscriber of the first telephone company misdials a telephone number and dials the NPA-NXX that was activated for testing purpose, the second telephone company would not have been previously advised that it was responsible for routing the NPA-NXX. As a result, the second company's routing tables would indicate that the first telephone company is responsible for routing the telephone call. When the second telephone company receives the NPA-NXX for routing, it consults its routing tables, and sees that the NPA-NXX is assigned to the first telephone company. As a result, it will return the telephone call to the first telephone company for routing. The first telephone company receives the telephone call, and sends it back to the second telephone company for routing. The call is sent back on another trunk, without releasing the first trunk as the call has not been established. This process continues, thereby creating a call loop.

Moreover, multiple trunks are devoted to the looping calls, resulting in inefficiency in the network. For example, when all lines in the trunk are used, the looping condition results in a reorder, meaning the calling party hears a busy signal, and has to redial the called number. Moreover, if the looping calls ties up all the trunks provisioned for the first telephone company then for the duration of the looping call, subscribers of the first telephone company are not be able to make any outbound calls. Often such looping conditions go undetected, because a call could ultimately be routed to the desired called party after several looping iterations. As a result, calling parties do not complain about inability to make calls.

A misrouted traffic condition occurs when a call originated by a calling party to a called party is directed to one or more tandem switches that are not normally involved in completing the call. For example, in a metropolitan area that has five tandem switches, namely, Tandem Switches A through E, a call originating from an originating end office associated with Tandem Switch A to a terminating end office associated with Tandem Switch E desirably uses a trunk linking Tandem Switch A to Tandem Switch E. The misrouted traffic condition occurs when Tandem Switch A, instead of routing the call to Tandem Switch E, misroutes the call to one or more of Tandem Switches B, C, and D. For example, the call may be misrouted such that it "snakes" from Tandem Switch A to Tandem Switch B, from Tandem Switch B to Tandem Switch C, from Tandem Switch C to Tandem Switch D, and finally from Tandem Switch D to Tandem Switch E, using up resources of four trunks, rather than just one. This type of misrouted traffic condition is sometimes referred to as a snaking condition.

A mass calling event occurs when multiple calling parties call a common called party simultaneously, or within a short period of time. One example of such mass calling event is associated with radio station call-ins. For example, when a radio station conducts a survey or a contest during which the general public is invited to call the radio station immediately or within a specific time frame, thousands of telephone calls are originated by the radio station's listeners. As known in the art, such mass calling of a common called party causes significant stress to a telephone company's network, particularly if the radio station does not warn the telephone company ahead of time. Such mass calling events can, among other things, aggravate the call looping and misrouted traffic conditions described above.

An excessive redialing event occurs when a calling party, within a relatively short time frame, repeatedly dials one or more called numbers. For example, excessive redialing can occur when a calling party repeatedly dials the same called number until connected. Redialing can be accomplished either manually or by invoking a feature of the telephone set used by the calling party. Excessive redialing can also occur when the calling party sequentially dials a number of called numbers. This can happen, for example, during a telemarketing campaign in which a computer is used to dial a large number of potential customers' telephone numbers. As known in the art, such excessive redialing causes significant stress to the telephone company's network. Accordingly, these invalid and undesirable conditions use up valuable network resources. Moreover, the cost to telephone companies to diagnose and repair such problems can be significant.

A conventional way to prevent the call looping condition described above is to use a switch-based "hop counter." Such a switch-based hope counter ensures that a message is not excessively delayed in arriving at the destination. The basic operation of the hop counter is as follows. A telephone network provisions a hop counter at a switch. The hop count is set to a count (e.g., 10) to track the number of times a particular call is looped through the switch. Each time a call is looped back to the switch, the hop counter count is decremented by one. If the hop counter count reaches 0 the call is dropped to prevent an excessive looping condition. As known in the art, the hop counter does not help detect the root cause of the looping condition. For example, the hop counter technology that exists today is not capable of finding errors in translation tables which may cause the looping condition. Moreover, the hop counter technology is not available to all telephone companies. As a result, these telephone companies cannot prevent call looping using a hop counter.

SUMMARY OF THE INVENTION

The present invention solves the foregoing problems by analyzing SS7 message traffic in a telephone network. By comparing data in the SS7 messages with information known in the terminating office, the present invention can detect invalid and undesirable network inefficiencies in different types of telephone networks, including for example, wireline, wireless, or hybrid networks.

In one embodiment, the present invention is a method for detecting errors in a telephone network. The method begins with the step of capturing an initial address message (IAM) generated by a switch. Data is extracted from the IAM for analysis. The extracted data is compared with network information. The network information includes, for example, a link point code and a digit table in a switch. A mismatch indicates there is an error condition in the telephone network. If there is a mismatch, the error is reported in an error message.

DETAILED DESCRIPTION OF THE INVENTION

Figure 1:
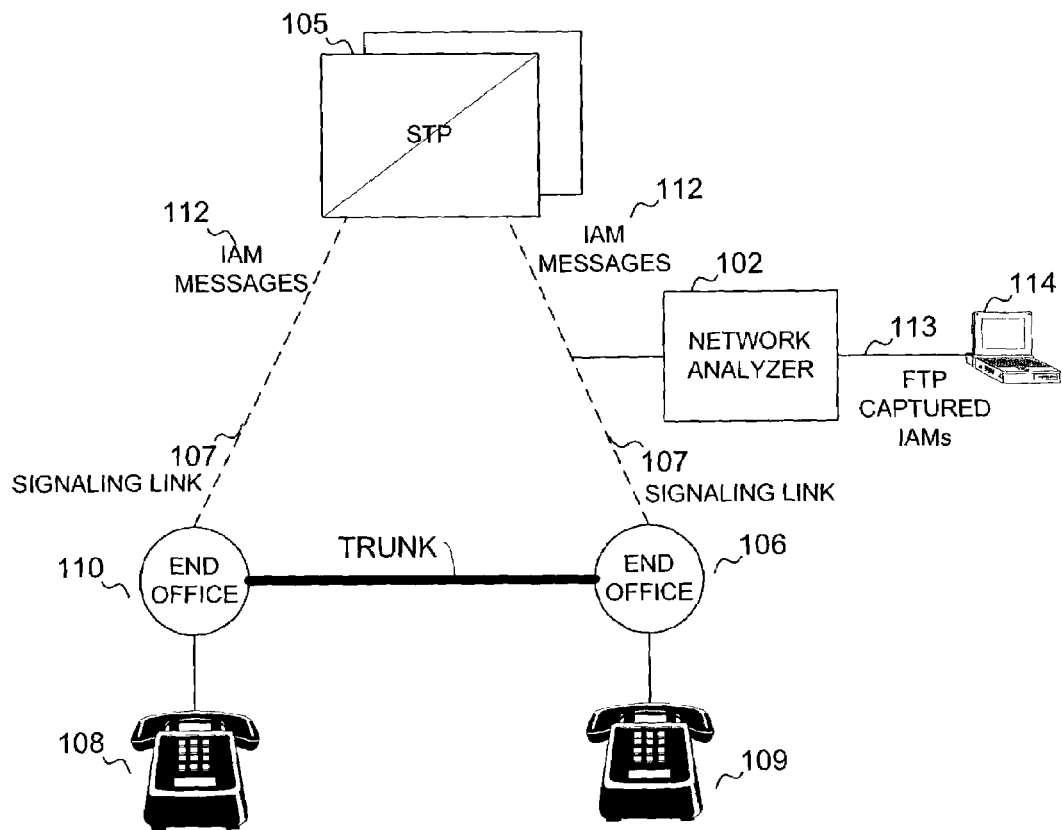
FIG. 1 is a schematic diagram of a system for intercepting and analyzing SS7 traffic according to an embodiment of the present invention.

FIG. 1 is a schematic diagram of a telephone network for intercepting and analyzing SS7 traffic to detect inefficiencies according to an embodiment of the present invention. A network analyzer 102 is attached to a network telephone 104 to intercept SS7 messages routed by signaling transfer point (STP) 105 to end office 106. Network analyzer 102 can be any network analyzer that can intercept the SS7 messages. One example is the HP Access 7 analyzer, manufactured by Hewlett Packard of Palo Alto, Calif. Network analyzer 102 can also be connected in terminating office 106.

When a call is made from a calling telephone 108 to a called telephone 109, end office 110 sends an Initial Address Message (IAM) 112 over an SS7 signaling link to end office switch 106. IAM 112 is sent to STP 105. STP 105 routes IAM 112 to a terminating switch according to pre-provisioned routing tables. In this case, for example, the terminating switch is end office 106. If a trunk for the call is successfully established, the call is routed from end office 110 to end office 106 over the established trunk. End office 106 then causes telephone 109 to ring. Network analyzer 112 captures IAM 112. IAM 112 comprises an Originating Point Code (OPC), a Destination Point Code (DPC), dialed digits, and optionally the calling party number and name. The OPC and DPC are the global originating and termination points in the network.

IAMs 113 captured by network analyzer 102 are sent to a computer 114. Computer 114 executes IAM analysis software to analyze the captured IAMs 113. Preferably, the captured IAMs 113 are transferred to the computer 114 using the well-known file transfer protocol (FTP).

Figure 2:
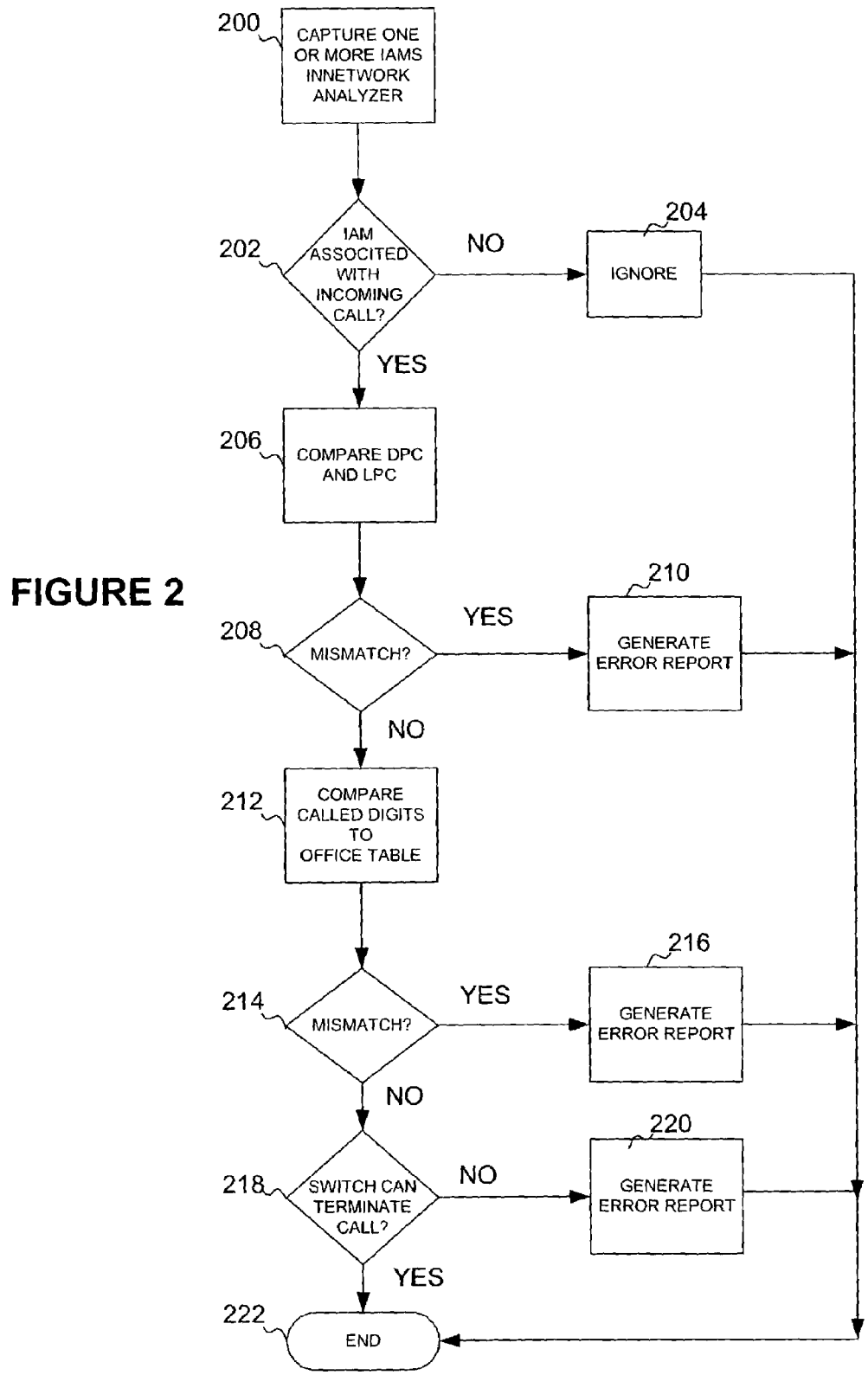
FIG. 2 is a flow chart for a method for intercepting and analyzing SS7 traffic to detect network inefficiencies according to an embodiment of the present invention.

FIG. 2 is a flow chart for analyzing IAMs to detect sources of inefficiency in a telephone network according to an embodiment of the present invention. In step 200, one or more of the IAMs are captured by network analyzer 102. Preferably, the IAM analysis software executing on computer 114 analyzes each captured IAM message in turn. In step 202, the software determines whether a captured IAM is associated with an incoming call.

If the captured IAM is not associated with an incoming call, then in step 204, the call is ignored and the software continues in step 222 where it continues processing of the next captured IAM. If the captured IAM is associated with an incoming call, then in step 206 the analysis software compares the destination point code (DPC) with the link point code (LPC) of the switch to which the IAM is directed. The LPC is the point code associated with the switch to which the IAM is directed.

In step 208, the analysis software determines whether the DPC in the IAM matches the LPC of the switch to which the IAM is directed. The LPC and DPC can mismatch for a number of reasons, including, for example erroneous entries in STP routing tables, errors in physical patches in the telephone network, and looping a link onto itself. These problems generally manifest themselves as an usually high number of calls that are not completed. If there is a mismatch, the software generates an error report indicating the mismatch in step 210. The error message provides an indication of the mismatch, thereby leading to quicker resolution of the problem. The method then continues to step 222 for processing of the next captured IAM.

If the DPC in the IAM matches the LPC of the switch to which the IAM is directed, the software compares the called digits with a digit table stored in the terminating end office in step 212. The digit table is a listing of numbers that the for which the terminating office is responsible. Preferably, the comparison is performed by the NPA-NXX of the called digits with NPA-NXX entries stored in the digit table. If desired, all dialed digits or any other portion thereof can be used for the comparison.

Whether the called digits match digits in the office table or not is determined in step 214. A mismatch indicates potential misrouting to telephone calls. That is, calls that are not supposed to be handled by a particular switch are being misdirected to that switch for handling. Knowledge of this problem provides information to system operators to enable them to quickly identify and fix the problem. For example, calls can be directed to different switches for handling based on class of service. Misdirected calls may result in services not being provided resulting in customer complaints. If there is a mismatch, a report indicating the mismatch is generated in step 216. The analysis software then continues in step 222 for processing of the next captured IAM.

In step 218, if the dialed digits match an entry in the digit table (as determined in step 214), the analysis software determines whether the call can terminate at the switch to which it has been directed. If the call cannot so terminate, the analysis software generates an error message indicating that the call cannot terminate. The analysis software then continues in step 222 for processing of the next captured IAM.

If the analysis software determines in step 218 that the call is able to terminate, the analysis software continues in step 222 with analysis of the next IAM. The analysis software can continues to analyze captured IAMs for a pre-determined period, until there are no captured IAMs available for analysis, or until commanded to terminate by a user.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for detecting errors in a telephone network, said method comprising the steps of:
   (a) capturing an Initial Address Message (IAM);
   (b) extracting data from the IAM for analysis, wherein the extracted data pertains to an intended destination switch of the IAM;
   (c) analyzing the extracted data;
   (d) comparing the extracted data with network information, wherein the network information pertains to a destination switch to which the IAM is being directed;
   (e) detecting an error by determining if there are mismatches in the data, wherein the mismatch indicates a difference between the intended destination switch and the destination switch to which the IAM is being directed.

2. The method of claim 1, wherein the network information includes a link point code that identifies the destination switch to which the IAM is being directed.

3. The method of claim 2, wherein the extracted data is a destination point code that identifies the intended destination switch, which is compared to the link point code.

4. The method of claim 1, wherein the network information includes a digit table that identifies the destination switch to which the IAM is being directed.

5. The method of claim 4, wherein the extracted data are dialed digits that identify the intended destination switch, which are compared to entries in the digit table.

6. The method of claim 1, wherein the TAM is captured at a terminating end office.

7. The method of claim 1, further comprising the step of generating an error message if there is a mismatch.

8. The method of claim 1, further comprising the step of determining if the dialed digits can terminate at the terminating end office.

9. The method of claim 1, further comprising the step of determining if there are other IAMs to be captured.

10. The method of claim 1, further comprising the step of determining ir the IAM is for an incoming call to a terminating end office where the IAM is captured.

11. The method of claim 10, further comprising the step of not analyzing extracted data and not determining if there is a mismatch if the IAM is not for an incoming call.

12. The method of claim 1, wherein the error detected causes a call looping condition.

13. The method of claim 1, wherein the error detected causes an excessive redialing condition.

14. The method of claim 1, wherein the error detected causes a large number of calls to not be completed.

15. The method of claim 1, wherein the error detected causes a snaking condition.

16. A system for detecting errors in a telephone network, said system comprising:
   (a) a network analyzer to intercept Initial Address Messages (IAM) generated by an originating end office and destined for a terminating end office;
   (b) an originating end office having a switch that generates an IAM message;
   (c) a Signal Transfer Point (STP) that receives the IAM message;
   (d) a terminating end office having a switch to receive the TAM message from the STP; and
   (e) a computer having IAM analysis software executing thereon for analyzing the IAM to determine whether there is an error by extracting data from the IAM that identifies an intended destination switch and comparing the extracted data to an identification of the switch of the terminating end office that receives the IAM.

17. The system of claim 16, wherein the network analyzer is attached to the switch of the terminating end office.

18. The system of claim 17, wherein the network analyzer is attached to an SS7 link between the STP and terminating end office.

19. The system of claim 17, wherein the network analyzer provides information to a computer using file transfer protocol.

20. A software program for detecting errors which cause undesirable conditions in a telephone network, said software program performing the steps of:
   (a) receiving IAMs from a network analyzer;
   (b) analyzing data contained in the IAMS, wherein the data identifies an intended destination switch;
   (c) comparing the data contained in the IAMs with network data, wherein the network data identifies a destination switch to which the IAM is being directed;
   (d) determining if there are mismatches in the data, wherein the mismatches indicated that the intended destination switch is not the destination switch to which the IAM is being directed; and
   (e) generating an error message if there are mismatches.

21. The software program of claim 20, wherein the network information includes a link point code that identifies the destination switch to which the IAM is being directed.

22. The software program of claim 21, wherein the extracted data is a destination point code that identifies the intended destination switch, which is compared to the link point code.

23. The software program of claim 20, wherein the network information includes a digit table that identifies the destination switch to which the IAM is being directed.

24. The software program of claim 23, wherein the extracted data are dialed digits that identify the intended destination switch, which are compared to entries in the digit table.

25. The software program of claim 20, wherein the TAM is captured at a terminating end office.

26. The software program of claim 20, further comprising the step of generating an error message if there is a mismatch.

27. The software program of claim 20, further comprising the step of determining if the dialed digits can terminate at the terminating end office.

28. The software program of claim 20, further comprising the step of determining if there are other IAMs.

29. The software program of claim 20, further comprising the step of determining if the IAM is for an incoming call to a terminating end office where the IAM is captured.

30. The software program of claim 29, further comprising the step of not analyzing extracted data and not determining if there is a mismatch if the IAM is not for an incoming call.

31. The software program of claim 20, wherein the error detected causes a call looping condition.

32. The software program of claim 20, wherein the error detected causes an excessive redialing condition.

33. The software program of claim 20, wherein the error detected causes a large number of calls to not be completed.

34. The software program of claim 20, wherein the error detected causes a snaking condition.

35. A method for detecting errors in a telephone network, said method comprising the steps of:
   (a) capturing one or more Initial Address Messages (IAM) at a terminating end office;
   (b) determining if the IAM is associated with an incoming call to the terminating end office where the IAM is captured;
   (c) not analyzing extracted data and not determining if there is a mismatch if the IAM is not associated with an incoming call;
   (d) extracting a destination point code from the IAM for analysis, the destination point code identifying an intended destination switch;
   (e) determining a link point code of terminating office, the link point code identifying a destination switch to which the IAM is being directed;
   (f) detecting if there is an error by comparing the destination point code with the link point code;
   (g) generating an error message if the destination point code and link point code do not match;
   (h) extracting the dialed digits from the IAM;
   (i) detecting if there is an error by comparing the dialed digits to a digit table for the terminating end office;
   (j) generating an error message of the called digits and the office digit table do not match;
   (k) detecting an error by determining if the call is able to terminate at the terminating end office; and
   (l) generating an error message if the call cannot terminate.

* * * * *